(12) United States Patent
Mizuno

(10) Patent No.: US 7,454,795 B2
(45) Date of Patent: Nov. 18, 2008

(54) DISK CONTROL UNIT

(75) Inventor: Makio Mizuno, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 236 days.

(21) Appl. No.: 10/754,857

(22) Filed: Jan. 9, 2004

(65) Prior Publication Data

US 2005/0097324 A1    May 5, 2005

(30) Foreign Application Priority Data

Oct. 30, 2003    (JP)    ............................. 2003-369810

(51) Int. Cl.
G06F 7/04    (2006.01)
(52) U.S. Cl. ..................... 726/27; 726/26; 380/200; 713/187; 711/164
(58) Field of Classification Search ................ 726/27, 726/3, 29
See application file for complete search history.

(56) References Cited

U.S. PATENT DOCUMENTS

| | | | |
|---|---|---|---|
| 5,163,097 A * | 11/1992 | Pegg | 713/183 |
| 5,235,642 A | 8/1993 | Wobber et al. | 713/156 |
| 5,574,903 A * | 11/1996 | Szymanski et al. | 707/1 |
| 6,219,771 B1 | 4/2001 | Kikuchi et al. | 711/164 |
| 6,260,120 B1 * | 7/2001 | Blumenau et al. | 711/152 |
| 6,263,445 B1 | 7/2001 | Blumenau | 726/2 |
| 6,377,994 B1 | 4/2002 | Ault et al. | 709/229 |
| 6,732,171 B2 | 5/2004 | Hayden | 709/223 |
| 6,931,530 B2 * | 8/2005 | Pham et al. | 713/165 |
| 6,938,096 B1 * | 8/2005 | Greschler et al. | 709/239 |
| 6,944,712 B2 * | 9/2005 | Weber et al. | 711/114 |
| 7,203,730 B1 * | 4/2007 | Meyer et al. | 709/213 |
| 2001/0020254 A1 | 9/2001 | Blumenau et al. | 709/224 |
| 2002/0049825 A1 | 4/2002 | Jewett et al. | 709/215 |
| 2002/0083339 A1 | 6/2002 | Blumenau et al. | 726/23 |
| 2002/0095602 A1 | 7/2002 | Pherson et al. | 726/1 |
| 2003/0016679 A1 * | 1/2003 | Adams et al. | 370/401 |
| 2003/0056063 A1 | 3/2003 | Hochmuth et al. | 711/152 |
| 2003/0115447 A1 | 6/2003 | Pham et al. | 713/153 |
| 2003/0126460 A1 | 7/2003 | Camble et al. | |
| 2003/0149884 A1 | 8/2003 | Hernandez et al. | 713/193 |
| 2003/0154281 A1 * | 8/2003 | Mitsuoka et al. | 709/225 |

(Continued)

FOREIGN PATENT DOCUMENTS

EP    03/005209    1/2003

(Continued)

OTHER PUBLICATIONS

Clark, Tom, "Internet Storage Name Server—IP Sans", Addison Wesley, Inc., XP002355409, 2002, pp. 153-178.

(Continued)

*Primary Examiner*—Kambiz Zand
*Assistant Examiner*—Roderick Tolentino
(74) *Attorney, Agent, or Firm*—Mattingly, Stanger, Malur & Brundidge, PC

(57) ABSTRACT

A disk control unit of a storage system stores identifiers of initiators that are capable of communications with storage devices and information of the storage devices correlated with the initiators. When an initiator performs a discovery processing, the disk control unit judges based on the information correlated with the initiator whether or not the initiator accessing to a storage device is illegal, and denies the access if illegal.

20 Claims, 5 Drawing Sheets

U.S. PATENT DOCUMENTS

| | | | |
|---|---|---|---|
| 2003/0154412 A1 | 8/2003 | Hetzler et al. | 726/4 |
| 2003/0159058 A1 | 8/2003 | Eguchi et al. | 713/193 |
| 2003/0236988 A1 | 12/2003 | Snead | 713/193 |
| 2004/0010701 A1 | 1/2004 | Umebayashi et al. | 713/193 |
| 2004/0015723 A1 | 1/2004 | Pham et al. | 726/27 |
| 2004/0088563 A1 | 5/2004 | Hogan et al. | 726/27 |
| 2004/0168173 A1 | 8/2004 | Cohen et al. | 719/310 |
| 2005/0091504 A1 | 4/2005 | Shirogane et al. | 713/182 |

FOREIGN PATENT DOCUMENTS

| | | |
|---|---|---|
| EP | 1324331 A2 | 7/2003 |
| EP | 1324331 A3 | 2/2005 |
| JP | 2000-276406 | 10/2000 |
| JP | 2003-248630 | 9/2003 |
| WO | 03/005209 | 1/2003 |
| WO | 2005/022326 | 3/2005 |

OTHER PUBLICATIONS

Tseng, Josh et al, "Internet Storage Name Service (iSNS)", IETF Standard Working Draft, Internet Engineering Task Force, CH, vol. ips, No. 17, Jan. 2003, 103 pp.

Erik Riedel et al, "Paranoia vs. performance—a quantitative evaluation of storage system security," HP Laboratories SSP technical memo HPL-SSP-2001-06, Feb. 2001.

Paul Stanton, "Securing Data in Storage: A Review of Current Research," ACM Computing Research Repository (CoRR) Technical Report 0409034, Sep. 2004.

Paul T. Stanton et al, "FABS: File and Block Surveillance System for Determining Anomalous Disk Accesses," Proceedings of the 2005 IEEE Workshop on Information Assurance, United States Military Academy, West Point, NY, Jun. 2005.

Satran, Julian et al, "iSCSI—IP Storage Working Group", RFC2026, Jan. 19, 2003, pp. 1-11, 214-217.

* cited by examiner

| INITIATOR IDENTIFIER | INITIATOR INTERFACE IDENTIFIER | AUTHORIZED INTERFACE IDENTIFIER | AUTHORIZED STORAGE DEVICE IDENTIFIER | LUN | ATTRIBUTE |
|---|---|---|---|---|---|
| A | I1 | IF1 | N1 | L0 | RO |
|   |   | IF2 | N1 | L0 | RW |
| B | I2 | IF3 | N1 | L1 | RW |
| C | I3 | IF4 | N2 | L3 | RO |
| OTHER | Ix | IFx | Nx | Lx | RW |

170

DISK CONTROL UNIT

BACKGROUND OF THE INVENTION:

1. Field of the Invention

The present invention relates to a security technology in computer systems.

2. Related Background Art

Nowadays, as a transmission method that realizes a storage area network (SAN), Fibre Channel-Storage Area Network (FC-SAN) that uses fibre channel has become the main stream. Fibre channel is highly reliable and its transmission performance is very high because it uses optical medium.

Recently, Ethernet®, which used to fall behind fibre channel in transfer performance, has achieved much higher speed with advances in the network technology, and is increasingly adopted to SAN while being traded on its unlimited connection distance, low cost and mutual connectivity. To distinguish from FC-SAN, SAN using Ethernet ® is called IP-SAN. Internet SCSI (iSCSI) is said to be the most influential means to realize the IP-SAN.

Various devices that are connected to a network are each provided with an identifier that indicates its own identify. For example, in an IP network, MAC addresses and IP addresses are used as identifiers, and in a fibre channel network, port IDs and World Wide Names (WWNs) are used as identifiers. Also, there are cases where a management computer that manages identifies and assists communications between devices (hereafter referred to as a "management server") is provided in a network. For example, in an IP network, a domain name system (DNS) server manages host names and their relation with IP addresses; and in a fibre channel system, a simple name server (SNS) manages WWNs and the like.

In this manner, various devices detect other devices on the network and mutually communicate through communications with a management server. Hereafter, a processing that is performed by a device to detect other devices on the network is called a discovery processing.

Three discovery processings (i.e., static configuration, SendTargets, and zero-configuration) in iSCSI that have been proposed are briefly discussed below.

(1) Static Configuration

In a static configuration, identifiers of target storage devices (IP addresses, TCP port numbers and target device names) are allocated in advance to an initiator. Therefore, the initiator can recognize the storage devices without requiring a discovery processing. It is noted that, among devices, a device that independently issues commands to search for other devices is called an initiator, and devices that respond to the commands issued by the initiator or devices which communicate with the initiator are called targets.

(2) SendTargets

SendTargets are used when an initiator already knows IP addresses of targets and TCP port numbers that are used in TCP protocol.

There are mainly two request types in SendTargets. One of them is a type that requests identification information of all devices that are controlled by each target (hereafter called an "all-device request"), and the other is a type that requests identification information of only designated devices (hereafter called a "device designation request"). Hereunder, a flow of a discovery processing by SendTargets is described with reference to FIG. 6.

First, an initiator issues a discovery request to a target (step 605).

Upon receiving the discovery request, the target reads and determines its request type (step 610).

When the request type is an all-device request, the target includes identification information of all devices that are controlled by the target in a response command, and transmits the response command to the initiator (step 615).

When the request type is a device-designation request, the target that has received the request includes identification information of only the designated devices in a response command, and returns the same to the initiator (step 620).

Upon receiving the response command, the initiator analyzes its content to thereby obtain the identification information of the devices that are controlled by the target (step 625), and starts a login processing, using the identification information, with the devices that are controlled by the target as new targets (step 630). When a login is accepted, an I/O processing is started (step 635).

(3) Zero-Configuration

Zero-configuration is a discovery method that uses a management server (that may be accompanied by an agent).

There are mainly two discovery methods in zero-configuration.

One of them is a method that uses Service Locator Protocol (SLP) that is already used in an IP network. To use SLP, a dedicated program called an agent needs to be introduced into an initiator and targets. Also, by placing a directory agent on a network, the management unit can be expanded. When a directory agent does not exist, the agents of the initiator and targets mutually exchange management information. When a directory agent exists, the agent of the initiator searches for the targets through the directory agent.

The other is a method that uses iSNS (Internet Storage Name Service). In iSNS, Simple Network Management Protocol (SNMP) for registering device information in a management server, i.e., iSNSP needs to be installed in each of the devices. Then, at the time when device information is registered in the management server, the management server notifies devices in the management unit (discovery domain) of the device information such that other devices can discover the devices whose device information are registered.

An effective device management in a storage network becomes possible through the use of an appropriate one of the discovery methods described above according to particular purposes and the size of the storage network.

To ensure the security in a storage system having a plurality of storage devices, the following method is conventionally implemented. The storage system retains a table that associates the storage system and identifiers of computers, which are required for the computers to login the storage system. The storage system compares an identifier included in a frame that is sent from a computer with the identifiers registered in the table, and continues processings according to instructions of the frame when there is a match; but returns a frame to refuse the received frame. In this manner, illegal accesses from unauthorized computers can be prevented.

The security of SAN can be provided by the following method. A disk control unit retains a record including configuration data that identifies storage devices accessed by each of authorized network devices. By using the record, the disk control unit judges whether a device having no data access privileges is a device that is authorized to have an access, and allows the access if the device is authorized, but denies the access if the device is not authorized.

According to the conventional technologies described above, computers can readily login a storage system with port IDs and WWNs in FC-SAN. This is because only computers that have already logged in the network are subject to the processing for preventing illegal accesses. Since FC-SAN is a somewhat closed network, and has a few illegal accesses, it was sufficient to conduct the processing to prevent illegal accesses against computers that had already logged in the network. However, for IP-SAN that has a broad range of connections, there are a greater number of illegal accesses. Accordingly, it is not enough for IP-SAN to cover only computers that have logged in the network. If the conventional technology is directly applied to IP-SAN without any changes, there is an increased threat in attacks such as denial of service (DoS) attacks to the storage system. It is noted that if the former conventional technology described above is mapped on iSCSI, identifiers of computers and storage devices would have iSCSI names.

SUMMARY OF THE INVENTION

The present invention relates to improvements of the security in a computer system that uses iSCSI.

In accordance with an embodiment of the present invention, a disk control unit of a storage system stores identifies of initiators that are capable of communications with storage devices and information of the storage devices. When an initiator performs a discovery processing, the disk control unit judges based on the information correlated with the initiator whether or not the initiator accessing to a storage device is illegal, and denies the access if illegal.

According to the present embodiment, the security is placed before a storage device (target) reveals its existence to a third party.

Other features and advantages of the invention will be apparent from the following detailed description, taken in conjunction with the accompanying drawings that illustrate, by way of example, various features of embodiments of the invention.

PREFERRED EMBODIMENTS OF THE PRESENT INVENTION

Figure 1:
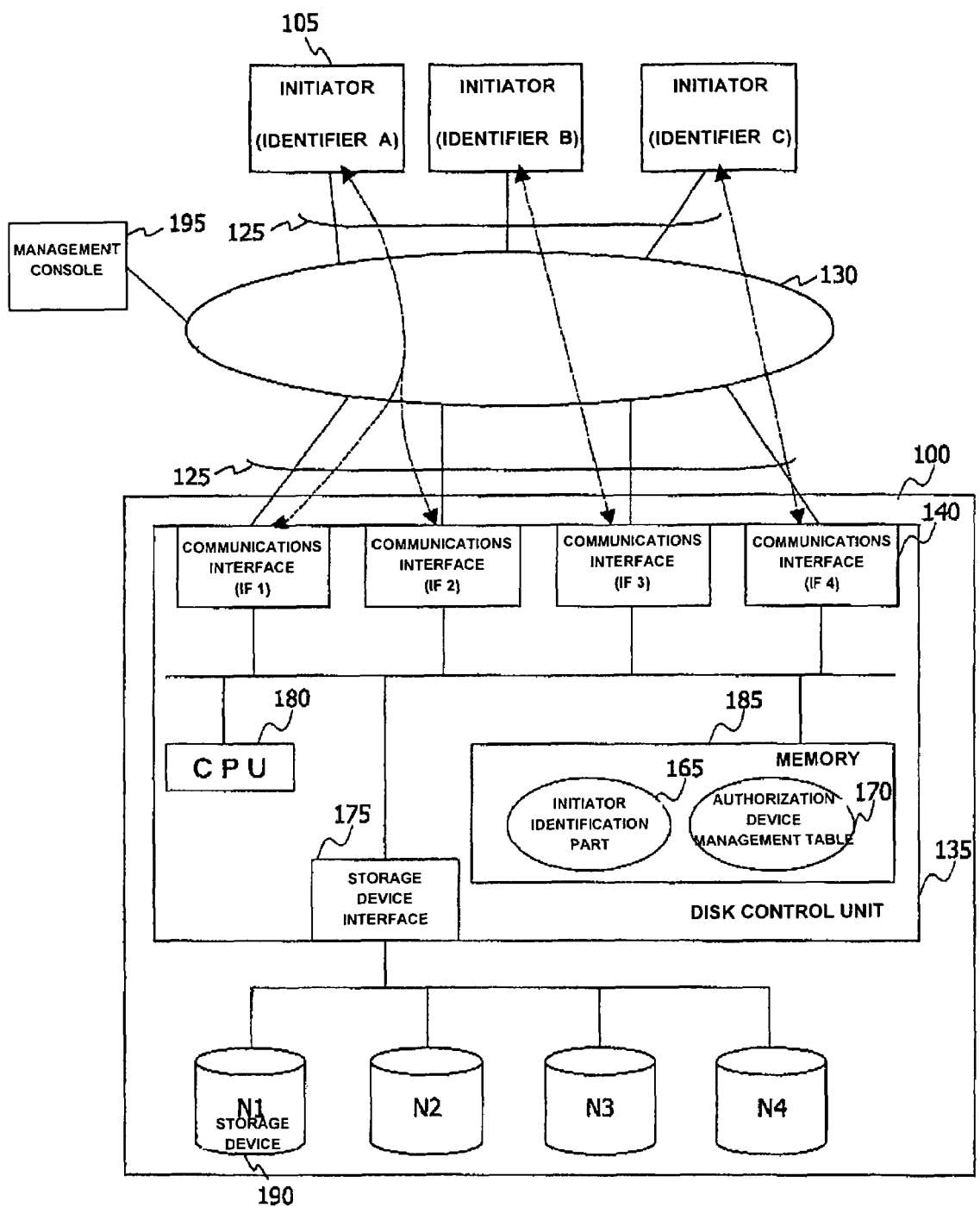
FIG. 1 schematically shows a diagram of the entire structure of a computer system.

FIG. 1 schematically shows a diagram of the entire structure of a computer system in accordance with an embodiment of the present invention. In the figure, software and data are indicated with ovals encircling them.

The computer system includes initiators 105, a storage system 100, a network 130, communications paths 125 that connect the initiators 105 and the network 130, and the storage system 100 and the network 130, respectively, and a management console 195 that is connected to the network 130.

The storage system 100 includes a disk control unit 135 and a plurality of storage devices 190. Also, the storage system 100, the disk control unit 135 and the storage devices 190 are target devices.

The initiators 105 are devices (such as computers) that communicate mainly with the disk control unit 135. In this example, the plurality of initiators 105 are assigned identifiers such as A, B and C (hereafter referred to as "initiator identifiers") in order to distinguish themselves from one to the other. Hereafter, the initiator 105 with the identifier A is abbreviated as the initiator A, the initiator 105 with the identifier B as the initiator B, and the initiator 105 with the identifier C as the initiator C.

The initiators 105 are connected to the network 130 via the communications paths 125.

The storage devices 190 store data, and read the stored data as necessary. The storage devices have one or more storage device identifiers. In FIG. 1, the four storage devices are assigned storage device identifiers N1, N2, N3 and N4, respectively.

The disk control unit 135 includes communications interfaces 140, a storage device interface 175 for communications with the storage devices 190, a CPU 180 and a memory 185.

The memory 185 stores an initiator identification part (program) 165 and an authorization device management table 170. Although the following description will be made, assuming that the initiator identification part 165 is a program, the initiator identification part 165 can be realized by dedicated hardware. Also, the CPU 180 that executes a relevant program in effect executes processings executed by the initiator identification part 165.

The communications interfaces 140 controls frames that are sent from the initiators 105. The communications interfaces 140 are assigned individually unique identifiers (for example, IF1, IF2, IF3 and IF4, which are hereafter referred to as "interface identifiers"). The identifiers may be composed of IP addresses, MAC addresses, TCP port number, or combinations of the above.

For controlling the frames, each of the communications interfaces 140 analyzes frames received and divides them into control information and data, and retrieves an initiator identifier and an interface identifier from the control information. Then, the communications interface 140 judges if the interface identifier that is assigned to it matches the interface identifier within the frame, and performs data processings.

In one aspect, the initiator identification part 165 uses the initiator identifier retrieved by the communications interface 140 to specify an initiator 105 of the transmission source. Information that is handled when controlling the frame is stored in the memory 185.

When a discovery processing is requested by one of the initiators 105, the CPU 180 uses the authorization device management table 170, and executes the initiator identification part 165, to thereby notify the initiator 105 of any of the storage devices 190 that is authorized to communicate (its details will be described with reference to FIG. 2).

The management console 195 manages devices such as the initiators 105 connected to the network 130, and the storage system 100 (including the disk control unit 135 and the storage devices 190). A system administrator may create an authorization device management table that is to be maintained in the disk control unit 135 and make additions and corrections to the authorization device management table through the management console 195. It is noted that the management consol 195 may be directly connected to the disk control unit 135, as a consol that manages the disk control unit 135.

Figures 3, 4:
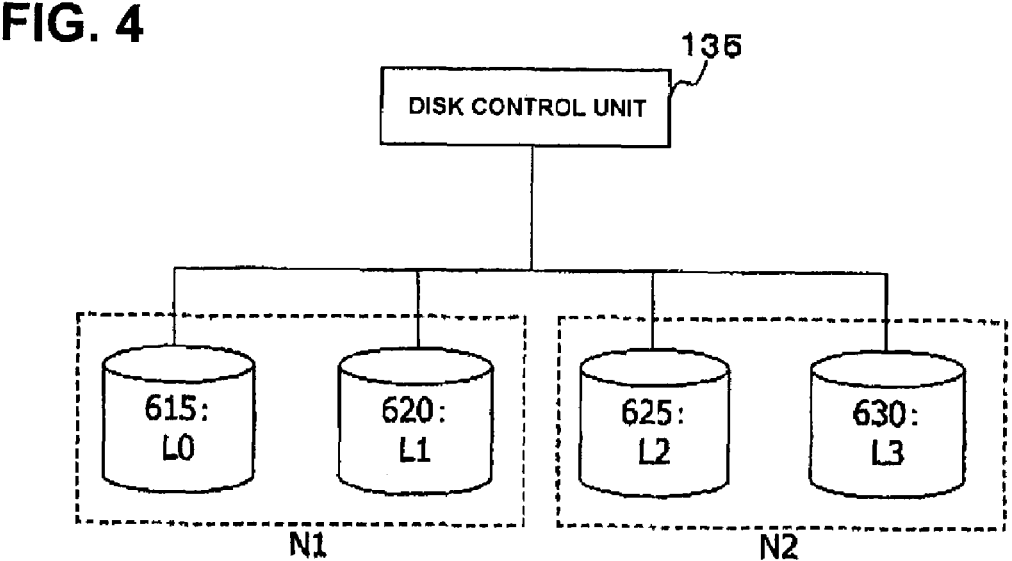
FIG. 3 shows a diagram of an example configuration of an authorization device management table.
FIG. 4 shows a diagram of an example arrangement of logical storage devices.

FIG. 3 shows a diagram of an example configuration of an authorization device management table 170. INITIATOR INTERFACE IDENTIFIER 310, LUN 325 and ATTRIBUTE 330 in the authorization device management table 170 in FIG.

3 will be described later. The authorization device management table 170 includes a plurality of entries making up a plurality of fields.

INITIATOR IDENTIFIER 305 contains fields in which initiator identifiers allocated to the initiators 105 that communicate with the disk control unit 135 are registered. In FIG. 3, values "A," "B" and "C" registered in fields corresponding to the respective entries correspond to the initiator identifiers allocated to the respective initiators 105 shown in FIG. 1. A value "OTHER" registered in the last entry in the table is provided for communications with initiators 105 that have identifies other than the initiator identifiers allocated to the three initiators 105. In other words, any initiators 105 that are covered by the entry "OTHER" correspond to those initiators that try illegal accesses, i.e., that are not authorized to access.

AUTHORIZED INTERFACE IDENTIFIER 315 contains fields in which interface identifiers of the communications interfaces 140 that communicate with the initiators 105 are registered. Values "IF1" through "IF4" registered in the respective entries correspond to the communications interfaces 140 shown in FIG. 1. Hereafter, the interface IF1 is abbreviated as "IF1." In the example of the illustrated embodiment, the initiator A communicates via IF1 and IF2 with the disk control unit 135, the initiator B via IF3 with the disk control unit 135, and the initiator C via IF4 with the disk control unit 135. A communications interface 140 indicated by IFx is allocated to initiators 105 corresponding to "OTHER." However, in effect, the communications interface 140 that corresponds to IFx does not exist, and initiators 105 corresponding to "OTHER" cannot communicate with the disk control unit 135.

AUTHORIZED STORAGE DEVICE IDENTIFIER 320 contains fields in which storage device identifiers of storage devices with which the initiators 105 can communicate via the communications interfaces 140. Values "N1" through "N4" registered in the respective entries correspond to the storage devices shown in FIG. 1, respectively. Hereafter, the storage device N1 is abbreviated as N1, the storage device N2 as N2, the storage device N3 as N3, and the storage device N4 as N4.

FIG. 3 indicates that the initiator A can communicate via IF1 and IF2 with N1, the initiator B via IF3 with N1, and the initiator C via IF4 with N2. Although a storage device 104 indicated as Nx is allocated to other initiators 105, such a storage device 104 corresponding to Nx does not in effect exist. It is noted that any communications interface or storage device may not particularly be allocated to initiators 105 that correspond to OTHER. In this case, a rejection processing to each access will be conducted.

In this manner, by setting IFx as an interface identifier of a communications interface that does not exist in the disk control unit, and Nx as a storage device identifier of a storage device that does not exist, the storage system 100 can shut out communications with initiators 105 that are not registered in the authorization device management table 170.

In this embodiment example, plural initiator identifiers designate plural initiators 105, respectively. However, for example, a plurality of initiators 105 may be designated together by one identifier by using a subnet address in IP addresses. In this case, one communications interface and one storage device can be readily allocated to a plurality of initiators 105.

The authorization device management table 170 may be created by a system administrator at the management console 195, and transferred by the management console 195 to the disk control unit 135. Alternatively, only data may be inputted at the management console 195, and the data may be registered in an authorization device management table 170 that has been created in advance at the disk control unit 135. The data of the authorization device management table 170 that have been once transferred can be additionally changed or corrected through the management console 195. When the management console 195 retains information relating to initiators 105 on the network and storage system 100 (IP addresses, port numbers, target device names, etc.), appropriate information is selected from among the stored information, and registered in the authorization device management table 170. When no information is retained at the management console 195, a system administrator may manually register necessary information.

Figure 2:
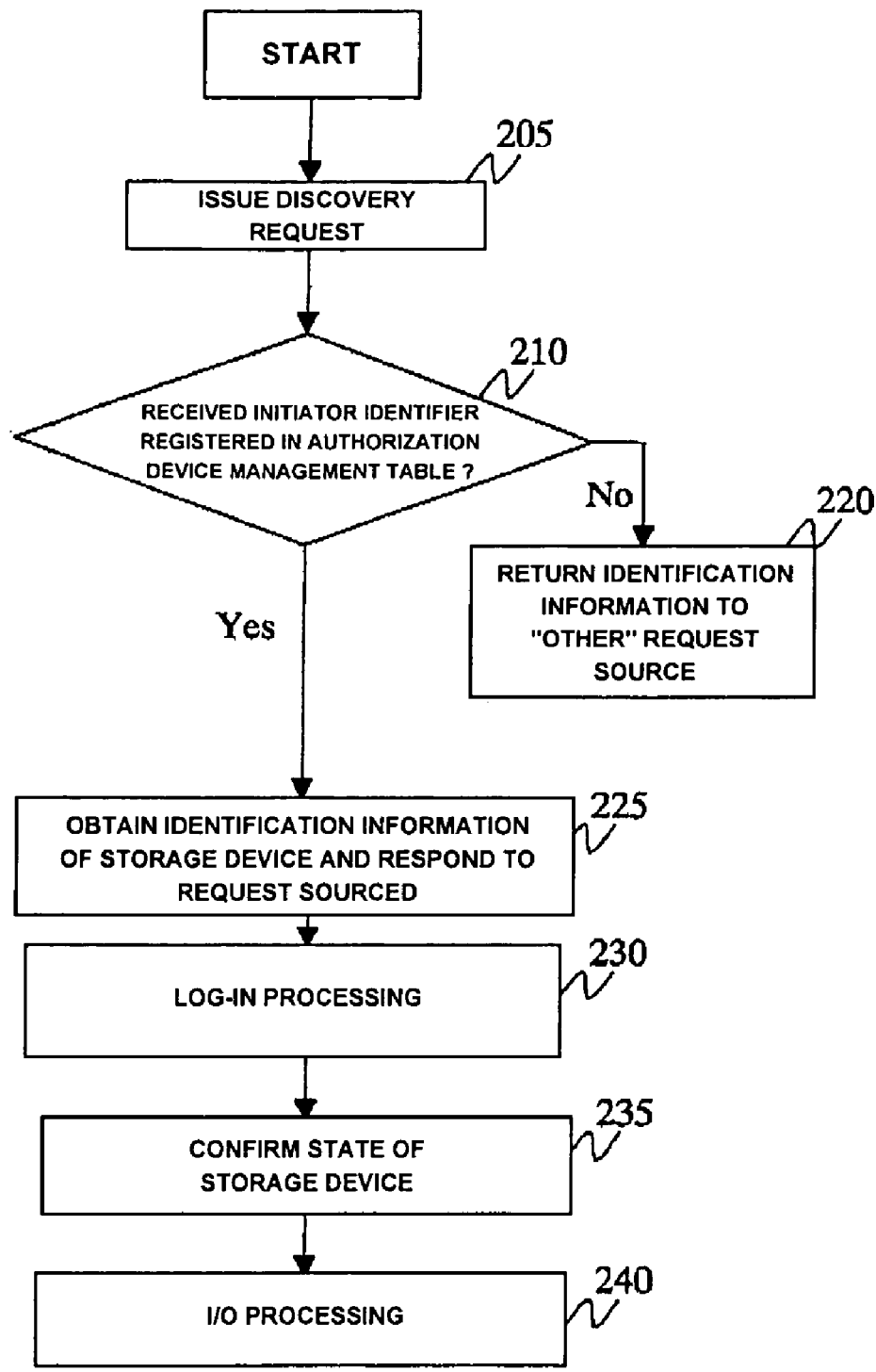
FIG. 2 is a flowchart of steps of discovery processing.

FIG. 2 is a flowchart of steps of a discovery processing.

First, one of the initiators 105 issues to the disk control unit 135 a discovery request for discovering storage devices 104 that are connected to the disk control unit 135 (step 205). This request includes an initiator identifier of the initiator 105 that issued the request and a request type. Further, in the case of a device designation request, the request includes identifiers of target storage devices 104 to be accessed.

Upon receiving the discovery request, the disk control unit 135 retrieves the initiator identifier from the request, and searches the authorization device management table 170 to determine if the received initiator identifier is registered in the authorization device management table 170 (step 210). If not registered, the disk control unit 135 returns to the request source initiator 105 an authorized interface identifier (IFx) corresponding to "OTHER" and an identifier (Nx) of a storage device 104 in the authorization device management table 170 (step 220).

In this case, upon receiving IFx and Nx, the initiator 105 transmits to the disk control unit 135 Nx as an identifier indicating the storage device 104. When the disk control unit 135 receives this identifier, the disk control unit 135 may repeat a response such as "No communicatable interface exists" or the like, or may not respond at all. As a result, initiators 105 that are not authorized by the disk control unit 135 cannot communicate with the disk control unit 135. In other words, illegal accesses can be prevented.

If the disk control unit 135 rejects connections to discovery requests from initiators 105 corresponding to "OTHER" in step 220, illegal accesses from such illegal initiators 105 can be prevented in an earlier stage.

When it is determined in step 210 that the received initiator identifier is registered, the disk control unit 135 obtains an authorized interface identifier and an authorized storage device identifier corresponding to the received initiator identifier from the authorization device management table 170, and transmits information of these identifiers to the request source initiator 105 (step 225).

Based on the interface identifier and the storage device identifier sent from the disk control unit 135, the request source initiator 105 issues a login command to a communications interface 140 of the disk control unit 135 corresponding to the received interface identifier. Upon receiving the login command, the disk control unit 135 conducts a login processing such as an authorization processing, and starts communications with the initiator 105 (step 230).

When the login processing is completed, the initiator 105 confirms conditions of the storage device 104 that can be used by the initiator 105 itself The processing to confirm conditions include, for example, a processing that obtains information unique to supply sources of the product, such as, the name of product supply source, product model and version, logical block addresses, capacity, and the like, a processing to investigate whether the storage device 104 is in an usable state, and the like (step 235).

After confirming that the storage device is normal, the initiator 105 can send SCSI commands (step 240). Thereafter, steps 205, 235 and 240 are repeated as necessary.

By the processing described above, only those of the initiators 105 that are authorized by the disk control unit 135 can receive information of those of the storage devices 104 that can be used by them, whereby a higher security can be ensured.

In the embodiment example, the description has been made assuming that the physical storage devices 104 are targets. However, in an actual storage system, there are cases where physical storage devices are virtually handled as a plurality of logical storage devices (hereafter referred to as "logical units"), or a plurality of physical storage devices are handled as a single logical unit. The present invention described above can also be applied to such cases.

More specifically, the storage device identifiers (for example, N1 and the like) allocated to physical storage devices 104 in the embodiment described above are allocated to logical units described above. When the disk control unit 135 receives a SendTarget request from an initiator 105 (for example, an initiator A), the disk control unit 135 returns to the initiator A storage device identifiers allocated to logical units that can be used by the initiator A. By this, the initiator A can recognize specified ones of the logical units, and can perform succeeding operations such as sending a login command and the like.

Accesses by initiators to logical units can be more finely controlled. One embodiment example to finely control initiators' accesses to logical units is described below.

In the present embodiment, storage device identifiers are assigned to physical storage devices 104 or logical units. An initiator 105 (for example, the initiator A) completes processings up to the login processing according to the procedure described above. Then, the initiator A issues to a target that can be accessed by the initiator A itself a command (communications packet) to request a list of logical units (hereafter referred to as "LUs") of the target (more specifically, logical unit numbers (hereafter referred to as "LUNs")). In terms of SCSI, such a command corresponds to ReportLUNs.

Upon receiving the command, the disk control unit 135 extracts from the authorization device management table 170 only LUs that the initiator A is authorized to access among LUs included in the target that the initiator A has been authorized to access in the SendTarget processing, and transmits to the initiator A the extracted information as a list of LUNs.

When the initiator A receives the list, the initiator A performs an actual input/output processing using only the LU included in the received list. As a result, communications with LUs that are unrelated to the initiator A are not required, and therefore the network load is alleviated. Also, even if an unauthorized initiator logs in, the escalation of possible damages can be prevented because the usable logical units are limited and other logical units are not affected.

The present embodiment will be described in greater details.

FIG. 4 shows a diagram of an example arrangement of logical storage devices. Two storage devices 104 are viewed by each initiator 105 as four LUs (L0-L3) as shown in FIG. 4. In effect, the disk control unit 135 has a logical-physical conversion table, and the disk control unit 135 performs an address conversion between the storage devices 104 and LUs using the logical-physical conversion table to provide the initiator 105 with the LUs.

In FIG. 4, L0, L1, L2 and L3 are LUNs, which correspond to the values registered at LUN 325 in FIG. 3. Hereafter, LUN "L0" is abbreviated as L0, LUN "L1" as L1, LUN "L2" as "L2" and LUN "L3" as L3. FIG. 3 indicates that the initiator A can communicate via IF1 and IF2 with L0 of N1, the initiator B via IF3 with L1 of N1, and the initiator C via IF4 with L3 of N2. Also, in the case of LUN 325, a non-existing Lx is defined for initiators having identifiers other than the initiator identifiers "A," "B" and "C."

INITIATOR INTERFACE IDENTIFIER 310 contains fields in which initiator interface identifiers, i.e., identifiers that are allocated to communications interface sections between the initiators 105 and the network 130 they have are registered. In this embodiment example, it is assumed that I1 is allocated to the initiator A, I2 to the initiator B, I3 to the initiator C, and Ix (actually in capable of communications) to other initiators.

It is noted that the initiator interface identifiers do not need to be registered at the time the authorization device management table 170 is set. Instead, when initiator identifiers are determined (more specifically, when a discovery request is received), initiator interface identifiers that are sent together with the request may be retrieved and set.

Figure 5:
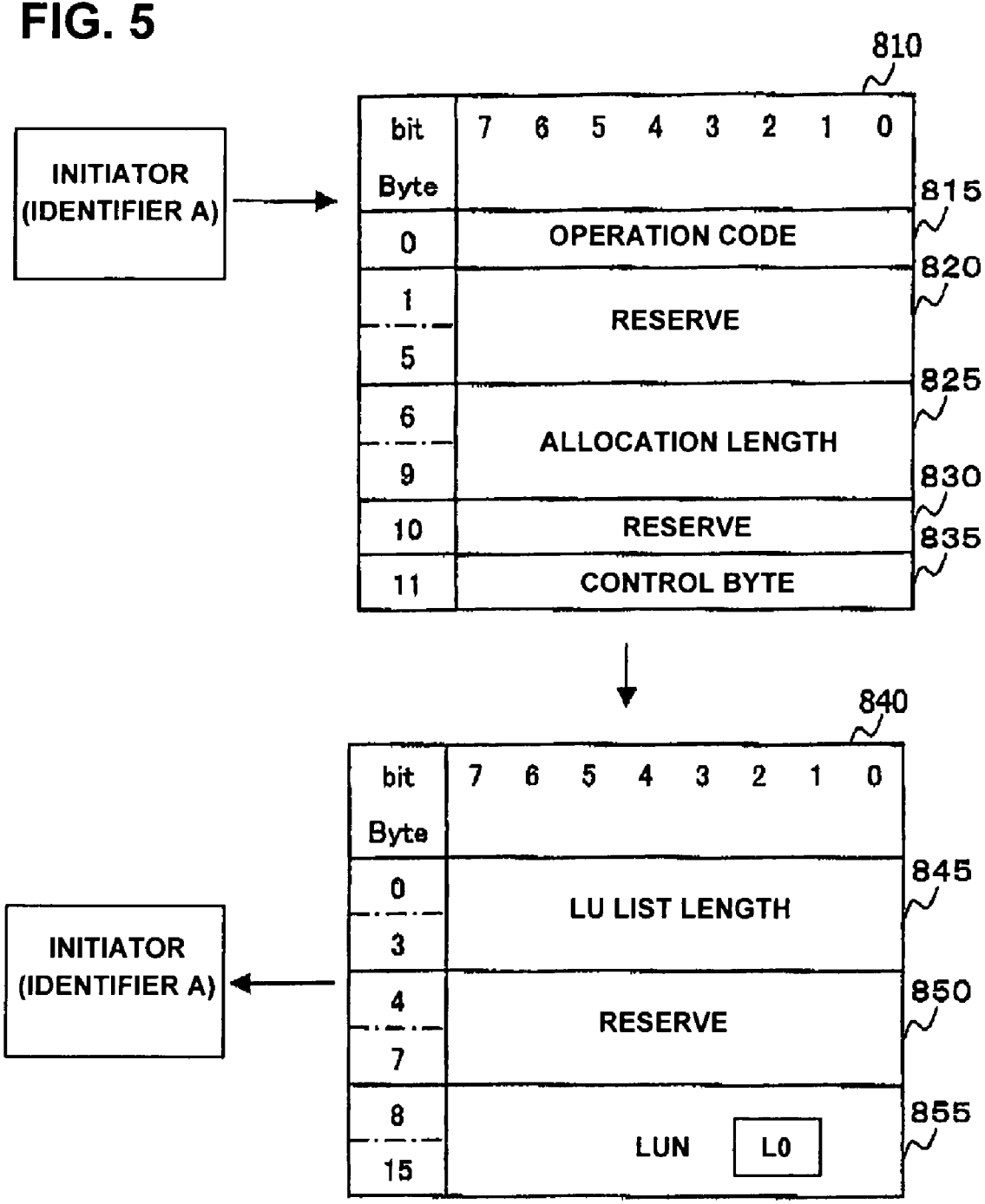
FIG. 5 shows a diagram of an example of a notification packet and a response packet of LUN.
Figure 6:
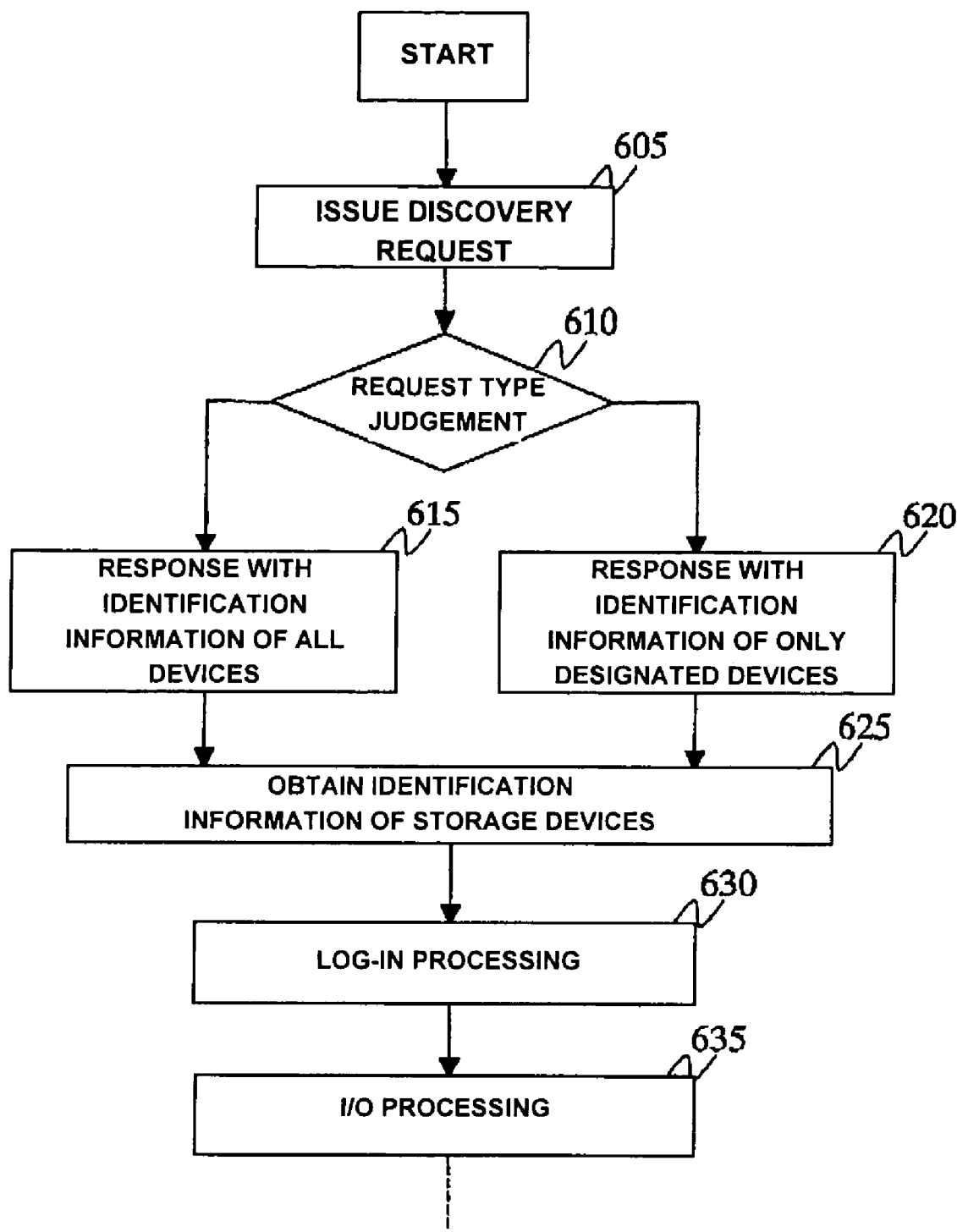
FIG. 6 is a flowchart of steps of conventional discovery processing.

FIG. 5 shows a request packet and a response packet of a LUN that is capable of communicating with an initiator 105 after a login processing is completed. FIG. 5 shows an example of request packet and response packet in communications that take place between the initiator A and the disk control unit 135.

The initiator A issues a command (a communications packet) 810 that requests a list of LUNs that the disk control unit 135 has. OPERATION CODE 815 in the command 810 indicates the type of the command. RESERVE 820 (and 830) indicates a region that is reserved in advance. ALLOCATION LENGTH 825 indicates the length (number of bytes) of data that can be transferred to the initiator A. CONTROL BYTE 835 indicates whether commands are continuously issued.

In this embodiment example, it is assumed that information of an initiator identifier "A" is sent with this command 810.

After receiving the command 810, the disk control unit 135 searches for an LUN in the authorization device management table 170, which corresponds to "A" (L0 in the example shown in FIG. 3), and embeds the searched LUN in a response command.

When a determination cannot be made with the initiator identifier A, the disk control unit 135 can make a determination with an initiator interface identifier of the transmission source. In this case, the disk control unit 135 searches for an LUN in the authorization device management table 170, which corresponds to the initiator interface identifier, and embeds information of the LUN in a response command to the initiator 105.

In FIG. 5, reference numeral 840 denotes a response (response packet) command that is sent in response to the command 810. LUN LIST LENGTH 845 in the response 840 indicates the length of data (number of bytes) of a list of LUNs, which can be transferred to the initiator. RESERVE 850 indicates a region that is reserved in advance. LUN REGION 855 registers information indicating an LUN corresponding to the initiator A (L0 in this example).

In this manner, the disk control unit 135 can notify each specified initiator 105 of LUNs of those of the storage devices 104 that are capable of communicating with the initiator 105. In other words, for example, in an environment where the storage system 100 is shared by departments, branch offices and the like, the storage devices 104 can be allocated to each of the departments and branch offices. Furthermore, LUs can be set in the notification such that finer regions can be allocated to the specified initiator 105 while ensuring the security of the storage system.

More specifically, for example, in FIG. 4, storage devices (or LUs) that are assigned N1 can be allocated as a target that can be accessed by computers (initiators) used in a department of a corporation, and further each LU included in N1 can be independently allocated to lower-level groups below the department. In this case, LUs allocated to computers (initiators) that are used by the lower-level groups may differ from one to the other, but these LUs are all included in N1, in other words, the storage regions can be hierarchically allocated.

Next, a method to use values registered in ATTRIBUTE 330 in FIG. 3 will be described.

ATTRIBUTE 330 contains a field that provides each LU with reading or writing attribute. A value "RW" registered in the field indicates that data reading and writing is possible, and a value "RO" indicates that data reading is possible. Also, other types of attributes may be defined and set in ATTRIBUTE.

When notifying an initiator, an appropriate attribute may be embedded in a response that is sent in response to Inquiry command in SCSI. An initiator 105 that is notified of the attribute transmits to a relevant logical unit only I/Os corresponding to the attribute, for example, only read commands if the notified attribute is RO.

The storage devices 190 may often use magnetic media. However, the storage devices 190 may be devices that use other media such as optical media. Also, the programs described in the present embodiment can be transferred from a storage medium such as CD-ROMs or the like, or downloaded via a network from other devices.

While the description above refers to particular embodiments of the present invention, it will be understood that many modifications may be made without departing from the spirit thereof The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A disk control unit coupled to a computer and a storage device, the disk control unit comprising:
   a first communication interface that is coupled to the computer via an IP-SAN and receives read and/or write requests from the computer;
   a storage device interface that is coupled to the storage device;
   a processing unit, coupled to the first communication interface and the storage device interface, that configures a first target device by using the storage device and configures a plurality of logical units in the first target device; and
   a memory, coupled to the processing unit, that stores relationship information which includes a first relation among a first identifier assigned to the computer, the first target device and one or more logical units of the plurality of logical units that the computer is permitted to access so as to allow the computer to access said one or more logical units in the first target device,
   wherein, during a process of discovery processing of an iSCSI protocol, the processing unit sends information of the first target device to the computer based on the relationship information stored in the memory and the first identifier in response to receiving a SendTargets request at the first communication interface from the computer so as to find a target device to be accessed by the computer,
   wherein, after the process of the discovery processing, the processing unit sends information of said one or more logical units, which the computer is authorized to access, to the computer based on the relationship information stored in the memory and the first identifier in response to receiving a request, which is used by the computer to ask the disk control unit to send information of the plurality of logical units included in the first target device, at the first communication interface, and
   wherein, if the first communication interface receives a second SendTargets request from a second computer of which a second identifier is not stored in the memory, the processing unit ignores the second SendTargets request.

2. A disk control unit according to claim 1,
   wherein the disk control unit is coupled to a management terminal, and
   wherein the relationship information are sent from the management terminal.

3. A disk control unit according to claim 1,
   wherein the disk control unit is coupled to a management terminal, and
   wherein the relationship information are set based upon an instruction from the management terminal.

4. A disk control unit according to claim 1,
   wherein the disk control unit is coupled to a management terminal, and
   wherein the relationship information are modified by the management terminal.

5. A disk control unit according to claim 1 further comprising a second communication interface coupled to the computer and the processing unit,
   wherein the first relation further includes a second identifier of the first communication interface so as to allow the computer to access the first target device and the one and more logical units via the first communication interface,
   wherein the relationship information further includes a second relation among the first identifier of the computer, the first target device, a second logical unit of the plurality of logical units and a third identifier of the second communication interface so as to allow the computer to access the second logical unit in the first target device via the second communication interface,
   wherein the processing unit sends information of the second logical unit to the computer instead of the information of the one or some logical units based on the relationship information stored in the memory, the first identifier and the third identifier of the second communication interface in response to receiving the request at the second communication interface.

6. A disk control unit according to claim 1,
   wherein the control unit is coupled to a second computer,
   wherein the first identifier is a subnet mask address of the computer and the second computer is assigned to the subnet mask address of the computer, and
   wherein the processing unit sends the information of the first target device to the second computer in response to receiving a second SendTargets request from the second computer, and the processing unit sends the information of the one or more logical units to the second computer in response to receiving a second request from the second computer.

7. A disk control unit according to claim 1, wherein the request is a REPORT LUNS.

8. A disk control unit coupled to a computer and a storage device, the disk control unit comprising:

a first communication interface that is coupled to the computer via an IP-SAN;

a second communication interface that is coupled to the computer;

a storage device interface that is coupled to the storage device;

a processing unit, coupled to the first communication interface, the second communication interface and the storage device interface, that configures a first target device and a second target device by using the storage device and configures a first one or more logical units in the first target device and a second one or more logical units in the second target device; and a memory, coupled to the processing unit, that stores relationship information which includes a first relation among a first identifier assigned to the computer, the first target device, the first one or more logical units and a second identifier of the first communication interface so as to allow the computer to access the first one or more logical units in the first target device via the first communication interface, and a second relation among the first identifier, the second target device, the second one or more logical units and a third identifier of the second communication interface so as to allow the computer to access the second one or more logical units in the second target device via the second communication interface, wherein, during a discovery session of iSCSI protocol, the first communication interface receives a SendTargets request from the computer, the SendTargets request is used by the computer to find a target device to be accessed by the computer, and the SendTargets request suggests the first identifier of the computer to the disk control unit, the processing unit sends information of the first target device based on the first relation stored in the memory, the first identifier suggested by the SendTargets request and the second identifier of the first communication interface in response to receiving the SendTargets request at the first communication interface, wherein, after the discovery session, the first communication interface receives a request which is used by the computer to ask the disk control unit to send information of a plurality of logical units included in the target device, and the request suggests the first identifier of the computer, and the processing unit sends information of the first one or more logical units to the computer based on the first relation stored in the memory, the first identifier suggested by the request and the second identifier of the first communication interface in response to receiving the request at the first communication interface, wherein, during the discovery session of iSCSI protocol, the second communication interface receives the SendTargets request from the computer during the processing unit sends information of the second target device based on the second relation stored in the memory, the first identifier suggested by the SendTargets request and the third identifier of the second communication interface in response to receiving the SendTargets request at the second communication interface, wherein, after the discovery session, the second communication interface receives the request, the processing unit sends information of the second one or more logical units to the computer based on the second relation stored in the memory, the first identifier suggested by the request and the third identifier of the second communication interface in response to receiving the request at the second communication interface, and wherein, if the first or the second communication interfaces receive a second SendTargets request from a second computer of which a fourth identifier is not stored in the memory, the processing unit ignores the second SendTargets request.

9. A disk control unit according to claim 8, wherein the disk control unit is coupled to a management terminal, and wherein the relationship information are sent from the management terminal.

10. A disk control unit according to claim 8, wherein the disk control unit is coupled to a management terminal, and wherein the relationship information are set based on an instruction sent from the management terminal.

11. A disk control unit according to claim 8, wherein the disk control unit is coupled to a management terminal, and wherein the relationship information are modified by the management terminal.

12. A disk control unit according to claim 8, wherein the control unit is coupled to a second computer, wherein the first identifier is a subnet mask address of the computer and the second computer is assigned to the subnet mask address of the computer, and wherein the processing unit sends the information of the first target device to the second computer in response to receiving a second SendTargets request at the first communication interface from the second computer, and the processing unit sends the information of the first one or more logical units to the second computer in response to receiving a second request at the first communication interface from the second computer.

13. A disk control unit according to claim 8, wherein the request is a REPORT LUNS.

14. A storage system coupled to a computer, comprising:

a storage device for storing data; and a disk control unit, coupled to the storage device, including a first communication interface coupled to the computer, a storage device interface coupled to the storage device, a processing unit coupled to the first communication interface and the storage device interface, that configures a first target device by using the storage device and configures a plurality of logical units in the first target device, and a memory coupled to the processing unit, that stores relationship information which includes a first relation among a first identifier assigned to the computer, the first target device and one or more logical units of the plurality of logical units that the computer is permitted to access so as to allow the computer to access said one or more logical units in the first target device, wherein, during a process of discovery processing of an iSCSI protocol, the processing unit sends information of the first target device to the computer based on the relationship information stored in the memory and the first identifier in response to receiving a SendTargets request at the first communication interface from the computer so as to find a target device to be accessed by the computer, wherein, after the process of the discovery processing, the processing unit sends information of said one or more logical units, which the computer is authorized to access, to the computer based on the relationship information stored in the memory and the first identifier in response to receiving a request, which is used by the computer to ask the disk control unit to send information of the plurality of logical units included in the first target device, at the first communication interface, wherein, if the first communication interface receives a second SendTargets request from a second computer of which a second identifier is not stored in the memory, the disk control unit ignores the second SendTargets request.

15. A storage system according to claim 14, wherein the disk control unit is coupled to a management terminal, and wherein the relationship information are sent from the management terminal.

16. A storage system according to claim 14, wherein the disk control unit is coupled to a management terminal, and wherein the relationship information are set based upon an instruction from the management terminal.

17. A storage system according to claim 14, wherein the disk control unit is coupled to a management terminal, and wherein the relationship information are modified by the management terminal.

18. A storage system according to claim 14, the disk control unit further comprising a second communication interface coupled to the computer and the processing unit, wherein the first relation further includes a second identifier of the first communication interface so as to allow the computer to access the first target device and the one and more logical units via the first communication interface, wherein the relationship information further includes a second relation among the first identifier of the computer, the first target device, a second logical unit of the plurality of logical units and a third identifier of the second communication interface so as to allow the computer to access the second logical unit in the first target device via the second communication interface, wherein the processing unit sends information of the second logical unit to the computer instead of the information of the one or some logical units based on the relationship information stored in the memory, the first identifier and the third identifier of the second communication interface in response to receiving the request at the second communication interface.

19. A storage system according to claim 14, wherein the storage system is coupled to a second computer, wherein the first identifier is a subnet mask address of the computer and the second computer is assigned to the subnet mask address of the computer, and wherein the processing unit sends the information of the first target device to the second computer in response to receiving a second SendTargets request from the second computer, and the processing unit sends the information of the one or more logical units to the second computer in response to receiving a second request from the second computer.

20. A disk control unit according to claim 14, wherein the request is a REPORT LUNS.

* * * * *